July 15, 1941.  W. PISTOR ET AL  2,249,493
CONNECTION FOR ELECTRIC CONDENSERS
Filed June 22, 1936
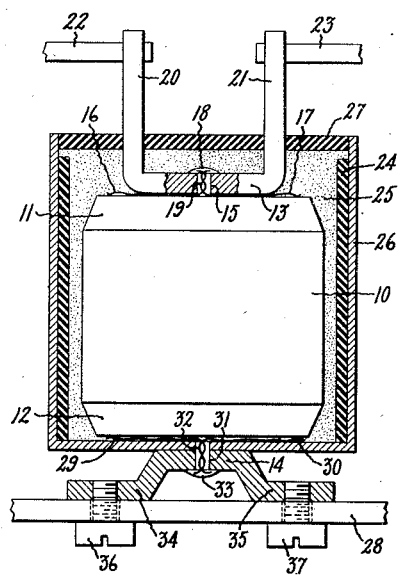
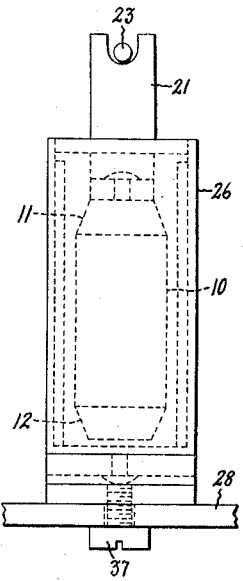
Inventors:
Wilhelm Pistor,
Paul Walther,
by Harry E. Dunham
Their Attorney.

Patented July 15, 1941

2,249,493

UNITED STATES PATENT OFFICE 2,249,493

CONNECTION FOR ELECTRIC CONDENSERS

Wilhelm Pistor, Berlin-Reinickendorf, and Paul Walther, Berlin-Kopenick, Germany, assignors to General Electric Company, a corporation of New York Application June 22, 1936, Serial No. 86,650
In Germany June 24, 1935

2 Claims. (Cl. 250—16)

The present invention relates to electric condensers and has for an object the provision of improved connections for reducing the impedance of the connections between an electric condenser and the conductors of an electric circuit to which the condenser is connected.

It has been found in electric circuits incorporating condensers particularly in those cases wherein the condensers are connected in parallel with the circuits, that the leads or conductors employed for connecting the condenser elements to the conductors of the circuits introduce undesirable disturbances. This is especially true in cases involving high frequency electric currents or in sensitive oscillation circuits such as in the connection of condensers for the elimination of radio interference and where low impedance radio frequency by-pass circuits are required in radio apparatus. With the most careful arrangement of the lead-in conductors, it has been found practically impossible to reduce the inductance and resistance values below a certain minimum. In consequence, the impedance of the circuit, the lead-in conductors and the condenser varies in an undesirable manner.

In accordance with the present invention, this disadvantage is avoided in that the electric circuit into which the condenser is to be incorporated is connected directly to the condenser electrodes or foils or, in other words, the conductors of the circuit are led directly into mechanical and electrical contact with the condenser electrodes without intermediate lead-in wires or connectors. This is attained, preferably by providing each of the electrodes or foils of the condenser elements with two separate connections which are adapted to be connected in series with a conductor of the circuit so that the lead-in conductors become a part of the circuit itself, thereby eliminating the necessity for separate lead-in conductors with their undesirable inductivity.

The details of the manner of carrying out the present invention will be understood from the following description taken in conjunction with the accompanying drawing wherein as an illustration of an exemplary embodiment of the invention, Fig. 1 shows an elevation, partially in section, of the broad side of a flat wound condenser connected in accordance with the present invention, and Fig. 2 shows an end view of the same condenser.

Referring to the drawing, 10 designates a condenser element of the wound or rolled type wherein the foils of opposite potential are arranged to project respectively from opposite ends of the roll as indicated at 11 and 12. To the exposed foil edges 11 and 12 are connected lead-in conductors in the form of bows 13 and 14 respectively. The upper connection bow 13 has a centrally disposed opening 15 and is secured in good electrical and mechanical contact with the exposed foil edges 11 in any suitable manner as for example by soldering. In order further to insure good electrical conductivity between the foil edges and the bow, wires 16 and 17, soldered in contact with the exposed foil edges, are interposed between the bow and the foil edges and are brought out through the opening 15 to the outer surface of the bow where they are securely soldered as indicated at 18, the wires being twisted as shown at 19 to reduce the inductance thereof. The two legs 20 and 21 of the U-shaped bow 13 are brought out and connected respectively to conductors 22 and 23 which in fact are a single conductor of a high frequency electric circuit interrupted between the ends of the portions 22 and 23 to provide for the connection in accordance with the present invention. Conductor portions 22 and 23 are connected in good mechanical and electrically conductive relation to the legs 20 and 21 respectively so that the bow 13 is connected in series with the interrupted conductor, the ends of which are represented by the portions 22 and 23, of the electric circuit to which the condenser is to be connected in parallel. For this purpose the other ends of the conductor portions are connected to appropriate separate terminals of high frequency circuit connections. The conductor portion 22 and leg 20 constitute one conductor and conductor portion 23 and the leg 21 constitute a second conductor which two conductors are connected directly to one point of one of the condenser electrodes as indicated at 18.

Condenser body 10 is surrounded by insulation strips and filling material as indicated at 24 and 25 and is enclosed in a suitable metallic casing 26, the upper end of which is closed by means of the sealing body 27.

At the lower end of the condenser is illustrated an alternate connection arrangement which is advantageous in those cases wherein it is desired that one of the foils of the condenser element be grounded directly to the metal enclosing casing which in turn is connected to a grounding element such as the base plate 28. In this case the lower exposed foil edges 12 of the condenser body 10 are disposed in good mechanical and electrically conductive relation with respect to the bottom wall of the metal casing 26 with wires 29 and 30 interposed between the foil edges and the inner surface of the casing wall, these wires preferably being soldered to the exposed foil edges. With this arrangement, connection bow 14 is fastened securely as by means of soldering to the outside surface of the casing wall and is provided with a centrally disposed opening 31 in alignment with an opening 32 in the wall of the casing. Openings 31 and 32 provide for bringing out the twisted wires 29 and 30 to the point where they are securely soldered to the underneath surface of the connection bow as shown at 33. Lugs 34 and 35 of the substantially U-shaped bow 14 are fastened to the base plate 28 by means of screws 36 and 37 respectively. It will of course be understood that connection bow 14, instead of being connected to a base or grounding plate 28, may be connected in a manner similar to connection bow 13 to an electric conductor similar to the conductor 22, 23 and forming the other side of the electric circuit.

In the practice of the present invention, the lead-in connectors or connection bows 13 and 14 should be of sufficient cross section to accommodate safely the currents which it is contemplated will flow in the main circuit conductors such as 22, 23 since these connection bows must carry the total current flow rather than merely the small condenser circuit currents which the separate type of lead-in wires heretofore employed have been designed to carry. Thus in some cases it may be insufficient to employ wires for the connection bows and may be necessary to employ solid conductors of considerable cross section. It is obvious therefore that the conductor portion 22, the bow legs 20 and 21, and the conductor portion 23 constitute a single conductor of considerable cross-section as may be determined by the total current flow having an intermediate point thereof connected directly to one point of one of the condenser electrodes as indicated at 18.

In some cases it may be found to suffice for the accomplishment of the objectives hereinbefore set forth to employ the improved connection arrangement of the present invention only in connection with one of the condenser element electrodes or foils. Furthermore, although the invention has been described and illustrated herein as applied to a condenser having only one condenser element it will be understood, of course, that the invention may be applied to condensers wherein several condenser elements are arranged in a single casing. In such case it is possible to provide only one connection bow or the like connector having two connection points, for all of the electrodes or foils of the several parallel connected condensers which are at the same potential.

The lead-in connectors or connection bows, connected to the foils of the condenser element, preferably should have in practice the same disposition as the conductors of the current circuit to which the condenser is to be connected.

What we claim as new and desire to secure by Letters Patent in the United States is:

1. In a high frequency circuit arrangement, a condenser having at least two electrodes, a plurality of connections for said high frequency circuit, a separate terminal for each of said connections, and separate means connecting each of said terminals directly to the same point on one of said electrodes.

2. In a high frequency circuit, a condenser having an electrode, and a plurality of separate high frequency conductors conductively attached to said electrode at one point.

WILHELM PISTOR.
PAUL WALTHER.